June 12, 1923.

J. H. DAIR 1,458,877

ATTACHMENT FOR DIFFERENTIAL GEARS

Filed Jan. 31, 1922

WITNESSES
Frederick Diehl.
Aug. H. Ott

INVENTOR
John H. Dair
BY Munn Co.
ATTORNEYS

Patented June 12, 1923.

1,458,877

UNITED STATES PATENT OFFICE.

JOHN HENRY DAIR, OF KEYPORT, NEW JERSEY.

ATTACHMENT FOR DIFFERENTIAL GEARS.

Application filed January 31, 1922. Serial No. 533,024.

*To all whom it may concern:*

Be it known that I, JOHN H. DAIR, a citizen of the United States, and a resident of Keyport, in the county of Monmouth and State of New Jersey, have invented a new and Improved Attachment for Differential Gears, of which the following is a full, clear, and exact description.

This invention has relation to differential gears and contemplates an attachment therefor which is designed to render the differential unit inactive whereby the axle sections are locked together for simultaneous driving.

At the present time it has been found that when one of the driving wheels of a motor vehicle becomes mired, the differential interferes with the extrication of a vehicle due to the fact that the mired driving wheel races while the other wheel remains stationary.

To overcome the above recited disadvantage, it is an object of the present invention to provide an attachment for a differential gear, which, in such instances as above noted, may be rendered operative to lock the axle sections for simultaneous and uniform driving.

As a further object the invention contemplates an attachment of the character described which when not in use in no way interferes with the regular function of the differential.

As a still further object the invention aims to provide a device of the character described which is extremely simple in its construction, inexpensive to manufacture, and which is thoroughly reliable and highly efficient in its purpose.

With the above recited and other objects in view, the invention resides in the novel construction set forth in the following specification, particularly pointed out in the appended claim and illustrated in the accompanying drawings, it being understood that the right is reserved to embodiments other than those actually illustrated herein to the full extent indicated by the general meaning of the terms in which the claim is expressed.

In the drawing—

Figure 1:
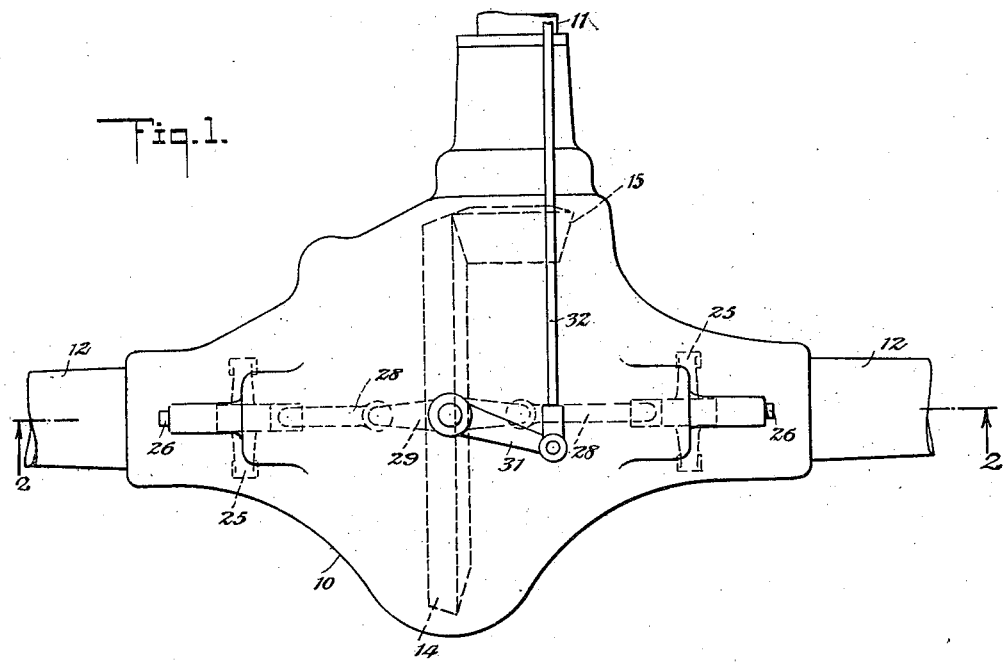
Figure 1 is a plan view of a differential equipped with an attachment of the character set forth.
Figure 2:
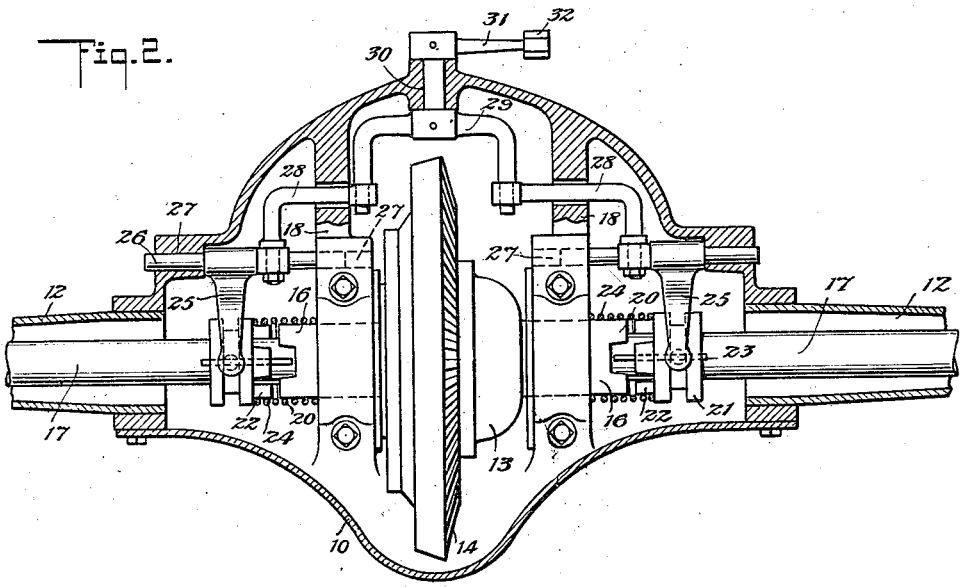
Fig. 2 is a transverse sectional view taken approximately on the line 2—2 of Fig. 1.

Referring to the drawings by characters of reference, 10 designates a differential housing from the forward portion of which the propeller shaft 11 extends and from the sides of which the axle housings 12 extend. The differential gearing unit is contained within the box or casing 13 to which is secured the usual master or ring gear 14 which meshes with the pinion 15 connected to and carried by the propeller shaft 11. The gear box or casing 13 is provided with the usual sleeves 16 projecting laterally therefrom and through which the inner end of the axle sections 17 extend into the casing 13. The sleeves 16 extend through the bearing walls 18 whereby the differential gear unit casing 13 is rotatably carried by the differential housing. The attachment constituting the invention and serving as a means for locking or coupling the axle sections 17 to each other for simultaneous driving consists in providing at the outer ends of the sleeves 16 clutch teeth 20 and mounting on the axle sections adjacent thereto sliding clutch members 21 provided with clutch teeth 22 on the inner faces which confront the outer ends of the sleeves 16. Where the axle sections 17 are round in cross section, a key 23 is provided which coacts with a keyway in the sliding clutch member whereby said clutch member is splined to the axle section for relative axial movement and for turning movement therewith. Where the axle section is square in cross section the sliding clutch member will be provided with a square bore thus eliminating the necessity of employing the key and keyway. The clutch teeth 20 and 22 are normally disengaged by means of a spring 24 which is interposed between the clutch member 21 and the bearing wall 18.

The means for effecting the engagement of the teeth 20 and 22 consists of a shifting fork 25 for use in connection with each clutch member 21. The shifting fork is secured to a stub shaft 26 axially slidable within the aligned bearing openings 27—27 provided respectively in the differential housing and the bearing wall 18. The stub shafts 26 are connected by a link 28 to the respective arms of a double crank 29 rotatably mounted in a bearing 30 in the top of the differential housing. The crank extremity extends through the bearing 30 and projects exteriorly of the differential housing and has secured thereto an arm 31 to which a shift rod 32 is connected, said shift rod leading to a point adjacent the operator.

Normally the differential unit operates in the usual manner to permit the axle sections 17 to turn at various relative rates of speed when driven through the pinion and ring gear 15 and 14, whereby it may function in its usual manner to compensate for the difference in speed between the driving wheels in making a turn. When one of the driving wheels becomes mired or encounters a slippery section of roadbed which lends greater tractive action to the other driving wheel, the operator by manipulating the shift rod 32 turns the double crank 29 to draw the stub shafts 26 inwardly. The inward movement of the stub shafts 26 effects simultaneous and inward movement of the shifting forks 25 and the sliding clutch members 21 thereby engaging the clutch teeth 20 and 22 against the action of the springs 24. This serves to rigidly couple the axle sections 17 with the differential gear unit casing 13 whereby the function of the differential is destroyed and a simultaneous and positive drive of the axle sections is accomplished. Immediately upon release of the shift rod 32, the springs 24 will function to disengage the clutch teeth 20 and 22 whereby the axle sections are uncoupled from the differential gear unit casing to permit the differential unit to perform its usual function. The attachment may be used in connection with floating or semi-floating axles and with practically any make of differential now in use.

I claim:

Operating means for the movable clutch members of the differential gear lock adapted to be contained within the differential housing and comprising a rotatable shaft journaled in the housing, a double crank carried by said shaft within the housing, a link pivotally connected to each arm of the crank, a shaft for each clutch member slidably arranged in the housing, each shaft being connected to one of said links, and a shifting fork carried by each shaft and engaged with a clutch member.

JOHN HENRY DAIR.